(12) United States Patent
Shammaa et al.

(10) Patent No.: US 12,662,187 B2
(45) Date of Patent: Jun. 23, 2026

(54) LATERAL ASYMMETRY MITIGATION THROUGH SIDE DEPENDENT UNDERSTEER COEFFICIENT ESTIMATION

(71) Applicant: GM Global Technology Operations LLC, Detroit, MI (US)

(72) Inventors: Abed Shammaa, Toronto (CA); Mohammadali Shahriari, Markham (CA); Ashraf Abualfellat, Grand Blanc, MI (US); Brandon Cicala, Farmington, MI (US); Hassan Askari, Thornhill (CA); Jackson Barry McGrory, Mississauga (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 50 days.

(21) Appl. No.: 18/954,878

(22) Filed: Nov. 21, 2024

(65) Prior Publication Data

US 2026/0138668 A1 May 21, 2026

(51) Int. Cl.
B62D 6/00 (2006.01)
B62D 15/02 (2006.01)

(52) U.S. Cl.
CPC ............. B62D 6/00 (2013.01); B62D 15/021 (2013.01)

(58) Field of Classification Search
CPC ....... B62D 6/00; B62D 15/021; B60W 30/02; B60W 30/045; B60W 50/0097; B60W 40/13; B60W 2552/30; B60W 2552/40; B60W 2530/203; B60W 2530/207; B60W 2720/30; B60W 2720/106; B60W 2300/14; B60W 2520/10; B60W 2556/10; B60W 2040/1307

USPC ...................................................... 701/41–44
See application file for complete search history.

(56) References Cited

U.S. PATENT DOCUMENTS

| | | | | |
|---|---|---|---|---|
| 5,407,023 A | * | 4/1995 | Yamashita | ...... B60W 30/18145 |
| | | | | 180/197 |
| 7,099,759 B2 | * | 8/2006 | Ghoneim | .............. B60W 40/10 |
| | | | | 303/146 |
| 2003/0229438 A1 | | 12/2003 | Hac | |
| 2006/0058935 A1 | * | 3/2006 | Ghoneim | .............. B62D 6/003 |
| | | | | 180/408 |

(Continued)

OTHER PUBLICATIONS

German Office Action for German Application No. 102025100385.8; dated Jul. 22, 2025; 4 pages.

*Primary Examiner* — Logan M Kraft
*Assistant Examiner* — Johnny H Hoang
(74) *Attorney, Agent, or Firm* — CANTOR COLBURN LLP

(57) ABSTRACT

A system performs a method for operating a vehicle. The system includes a trajectory planning system for controlling a trajectory of the vehicle and a processor. The processor is configured to determine a left turn understeer coefficient for the vehicle using data obtained during a left turn of the vehicle, determine a right turn understeer coefficient for the vehicle using data obtained during a right turn of the vehicle, determine an arbitrated understeer coefficient from at least one of the left turn understeer coefficient and the right turn understeer coefficient, and provide the arbitrated understeer coefficient to the trajectory planning system. The trajectory planning system controls a lateral motion of the vehicle by operating the vehicle using the arbitrated understeer coefficient.

20 Claims, 6 Drawing Sheets

(56) References Cited

U.S. PATENT DOCUMENTS

| | | | |
|---|---|---|---|
| 2006/0287777 A1* | 12/2006 | Katrak | G05D 1/0891 |
| | | | 701/1 |
| 2007/0051554 A1* | 3/2007 | Thacher | B60T 8/1755 |
| | | | 180/445 |
| 2007/0213901 A1* | 9/2007 | Shin | B62D 6/007 |
| | | | 180/443 |
| 2009/0030573 A1* | 1/2009 | Mikamo | B62D 6/003 |
| | | | 701/41 |
| 2011/0106381 A1* | 5/2011 | Filev | B60W 50/08 |
| | | | 701/40 |
| 2012/0109460 A1* | 5/2012 | Tokimasa | B60W 50/045 |
| | | | 701/1 |
| 2018/0043931 A1 | 2/2018 | Gupta et al. | |
| 2020/0172102 A1* | 6/2020 | Hirota | B60W 10/18 |
| 2024/0132054 A1* | 4/2024 | Weston | B60W 30/02 |

* cited by examiner

LATERAL ASYMMETRY MITIGATION THROUGH SIDE DEPENDENT UNDERSTEER COEFFICIENT ESTIMATION

The subject disclosure relates to vehicles and, in particular, to systems and methods for correcting an understeer coefficient estimate for vehicle asymmetries.

Most modern vehicles call for caster and camber angles that differ slightly on the right side compared to the left side. For vehicles that drive on the right side of the road, the right-side tires will have a more negative camber than the left-side tires and more positive caster than the left-side tires. For vehicle that drive on the left side of the road, this is inverted. These differences cause asymmetry in the driving. This asymmetry causes assisted driving systems to provide asymmetric controls in various control maneuvers. On a curve, this can result in a lane touch. Accordingly, it is desirable to provide a system and method for controlling the vehicle given the asymmetry in camber and caster angles to prevent lane touch.

SUMMARY

In one exemplary embodiment, a method of operating a vehicle is disclosed. A left turn understeer coefficient for the vehicle is determined using data obtained during a left turn of the vehicle. A right turn understeer coefficient for the vehicle is determined using data obtained during a right turn of the vehicle. An arbitrated understeer coefficient is determined from at least one of the left turn understeer coefficient and the right turn understeer coefficient. A lateral motion of the vehicle is controlled by operating the vehicle using the arbitrated understeer coefficient.

In addition to one or more of the features described herein, at least one of a left caster angle is different than a right caster angle and a left camber angle is different than a right camber angle.

In addition to one or more of the features described herein, the method further includes determining the left turn understeer coefficient when a steering wheel angle is to a left side and is greater than a left turn enablement threshold and determining the right turn understeer coefficient when the steering wheel angle is to a right side and is greater than a right turn enablement threshold.

In addition to one or more of the features described herein, the method further includes determining a wheel misalignment when a difference between the left turn understeer coefficient and the right turn understeer coefficient is greater than a difference threshold.

In addition to one or more of the features described herein, selecting the arbitrated understeer coefficient further includes at least one of selecting the left turn understeer coefficient, selecting the right turn understeer coefficient, selecting an average of the left turn understeer coefficient and the right turn understeer coefficient, and selecting a combination of the left turn understeer coefficient and the right turn understeer coefficient.

In addition to one or more of the features described herein, the method further includes one of selecting the left turn understeer coefficient when the vehicle is making a left turn and selecting the right turn understeer coefficient when the vehicle is making a right turn.

In addition to one or more of the features described herein, controlling the lateral motion of the vehicle further includes using a feedforward steering wheel angle calculated using the arbitrated understeer coefficient.

In another exemplary embodiment, a system for operating a vehicle is disclosed. The system includes a trajectory planning system for controlling a trajectory of the vehicle and a processor. The processor is configured to determine a left turn understeer coefficient for the vehicle using data obtained during a left turn of the vehicle, determine a right turn understeer coefficient for the vehicle using data obtained during a right turn of the vehicle, determine an arbitrated understeer coefficient from at least one of the left turn understeer coefficient and the right turn understeer coefficient, and provide the arbitrated understeer coefficient to the trajectory planning system, wherein the trajectory planning system is configured to control a lateral motion of the vehicle by operating the vehicle using the arbitrated understeer coefficient.

In addition to one or more of the features described herein, at least one of a left caster angle is different than a right caster angle and a left camber angle is different than a right camber angle.

In addition to one or more of the features described herein, the processor is further configured to determine the left turn understeer coefficient a steering wheel angle is to a left side and is greater than a left turn enablement threshold and determine the right turn understeer coefficient when the steering wheel angle is to a right side and is greater than a right turn enablement threshold.

In addition to one or more of the features described herein, the processor is further configured to determine a wheel misalignment when a difference between the left turn understeer coefficient and the right turn understeer coefficient is greater than a difference threshold.

In addition to one or more of the features described herein, the processor is further configured to select the arbitrated understeer coefficient by performing at least one of selecting the left turn understeer coefficient, selecting the right turn understeer coefficient, selecting an average of the left turn understeer coefficient and the right turn understeer coefficient, and selecting a combination of the left turn understeer coefficient and the right turn understeer coefficient.

In addition to one or more of the features described herein, the processor is further configured to perform one of selecting the left turn understeer coefficient when the vehicle is making a left turn and selecting the right turn understeer coefficient when the vehicle is making a right turn.

In addition to one or more of the features described herein, the processor is further configured to control the lateral motion of the vehicle using a feedforward steering wheel angle calculated using the arbitrated understeer coefficient.

In another exemplary embodiment, a vehicle is disclosed. The vehicle includes a sensor for measuring a steering wheel angle of the vehicle, a trajectory planning system for controlling a trajectory the vehicle, and a processor. The processor is configured to determine a left turn understeer coefficient for the vehicle using data obtained when the steering wheel angle indicates a left turn of the vehicle, determine a right turn understeer coefficient for the vehicle using data obtained when the steering wheel angle indicates a right turn of the vehicle, determine an arbitrated understeer coefficient from at least one of the left turn understeer coefficient and the right turn understeer coefficient, and provide the arbitrated understeer coefficient to the trajectory planning system, wherein the trajectory planning system is configured to control a lateral motion of the vehicle by operating the vehicle using the arbitrated understeer coefficient.

In addition to one or more of the features described herein, at least one of a left caster angle is different than a right caster angle and a left camber angle is different than a right camber angle.

In addition to one or more of the features described herein, the processor is further configured to determine the left turn understeer coefficient when the steering wheel angle is to a left side and is greater than a left turn enablement threshold and determine the right turn understeer coefficient when the steering wheel angle is to a right side and is greater than a right turn enablement threshold.

In addition to one or more of the features described herein, the processor is further configured to determine a wheel misalignment when a difference between the left turn understeer coefficient and the right turn understeer coefficient is greater than a difference threshold.

In addition to one or more of the features described herein, the processor is further configured to select the arbitrated understeer coefficient by performing at least one of selecting the left turn understeer coefficient, selecting the right turn understeer coefficient, selecting an average of the left turn understeer coefficient and the right turn understeer coefficient, and selecting a combination of the left turn understeer coefficient and the right turn understeer coefficient.

In addition to one or more of the features described herein, the processor is further configured to control the lateral motion of the vehicle using a feedforward steering wheel angle calculated using the arbitrated understeer coefficient.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
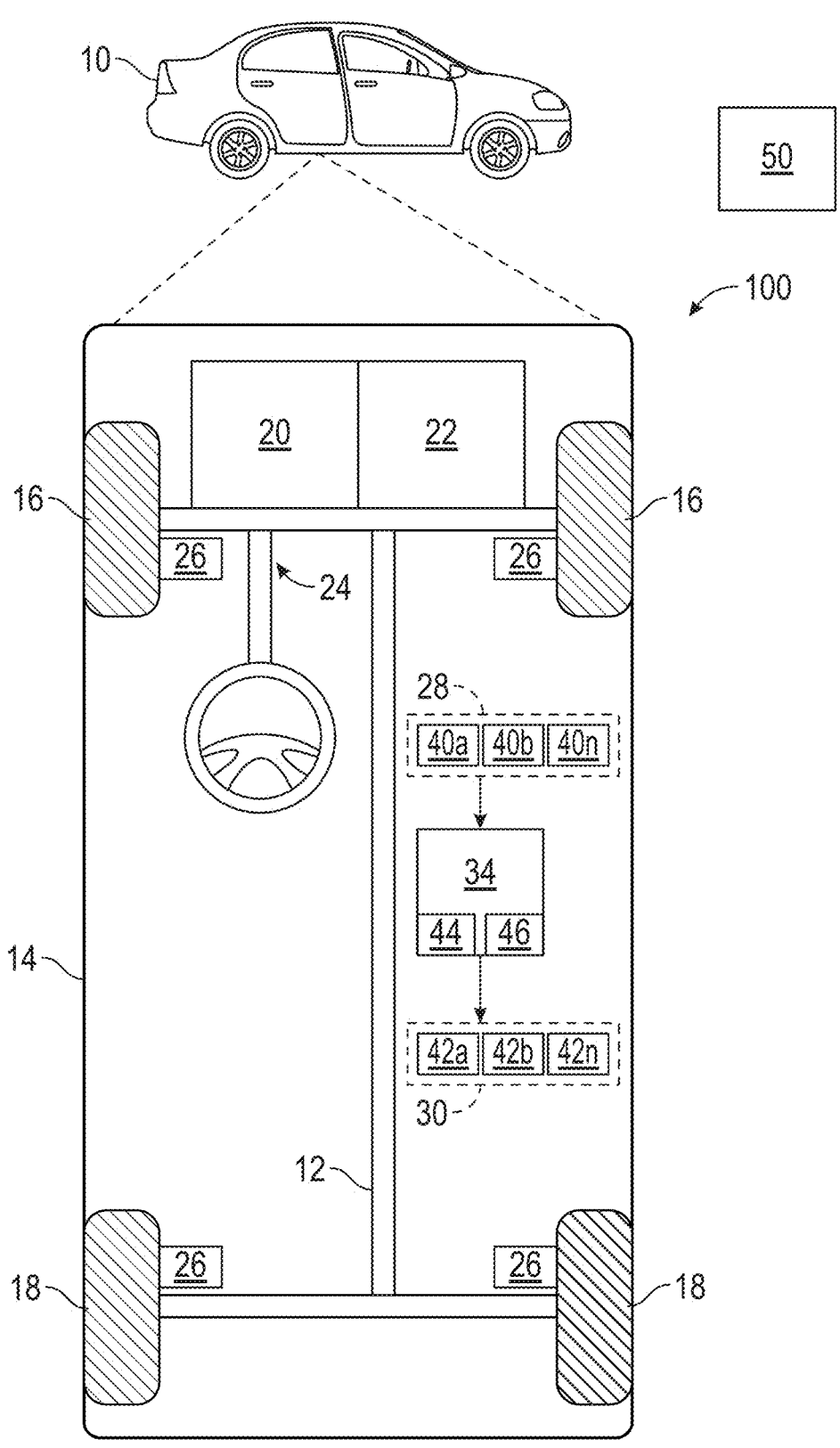
FIG. 1 shows an autonomous vehicle with an associated trajectory planning system or trajectory planner, in accordance with an exemplary embodiments.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows an autonomous vehicle 10 with an associated trajectory planning system or trajectory planner depicted at 100. In general, the trajectory planning system 100 determines a trajectory plan for automated driving of the autonomous vehicle 10. The autonomous vehicle 10 generally includes a chassis 12, a body 14, front wheels 16, and rear wheels 18. The body 14 is arranged on the chassis 12 and substantially encloses components of the autonomous vehicle 10. The body 14 and the chassis 12 may jointly form a frame. The front wheels 16 and rear wheels 18 are each rotationally coupled to the chassis 12 near respective corners of the body 14.

In various embodiments, the trajectory planning system 100 is incorporated into the autonomous vehicle 10. The autonomous vehicle 10 is, for example, a vehicle that is automatically controlled to carry passengers from one location to another. The autonomous vehicle 10 is depicted in the illustrated embodiment as a passenger car, but it should be appreciated that any other vehicle including motorcycles, trucks, sport utility vehicles (SUVs), recreational vehicles (RVs), etc., can also be used. At various levels, an autonomous vehicle can assist the driver through a number of methods, such as warning signals to indicate upcoming risky situations, indicators to augment situational awareness of the driver by predicting movement of other agents warning of potential collisions, etc. The autonomous vehicle has various levels of intervention or control of the vehicle through coupled assistive vehicle control all the way to full control of all vehicle functions. A Level Four system indicates "high automation," referring to the driving mode-specific performance by an automated driving system of all aspects of the dynamic driving task, even if a human driver does not respond appropriately to a request to intervene. A Level Five system indicates "full automation," referring to the full-time performance by an automated driving system of all aspects of the dynamic driving task under all roadway and environmental conditions that can be managed by a human driver.

The autonomous vehicle includes left wheels and right wheels. The left wheels are mounted to the vehicle such that the left wheels define a left caster angle and a left camber angle. The right wheels are mounted to the vehicle such that the right wheels define a right caster angle and a right camber angle.

As shown, the autonomous vehicle 10 generally includes a propulsion system 20, a transmission system 22, a steering system 24, a brake system 26, a sensor system 28, an actuator system 30, and a controller 34. The propulsion system 20 may, in various embodiments, include an internal combustion engine, an electric machine such as a traction motor, and/or a fuel cell propulsion system. The transmission system 22 is configured to transmit power from the propulsion system 20 to the front wheels 16 and rear wheels 18 according to selectable speed ratios. According to various embodiments, the transmission system 22 may include a step-ratio automatic transmission, a continuously variable transmission, or other appropriate transmission. The brake system 26 is configured to provide braking torque to the front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The sensing devices 40a-40n obtain measurements or data related to various objects or agents 50 within the vehicle's environment. Such agents 50 can be, but are not limited to, other vehicles, pedestrians, bicycles, motorcycles, etc., as well as non-moving objects. The sensing devices 40a-40n can also obtain traffic data, such as information regarding traffic signals and signs, etc.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but not limited to, doors, a trunk, and cabin features such as ventilation, music, lighting, etc. (not numbered).

The controller 34 includes a processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which includes an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. The instruction may also perform logic, calculations, methods and/or algorithms for determining side-dependent understeer coefficients and controlling the vehicle using these coefficients, using the methods disclosed herein.

Figure 2:
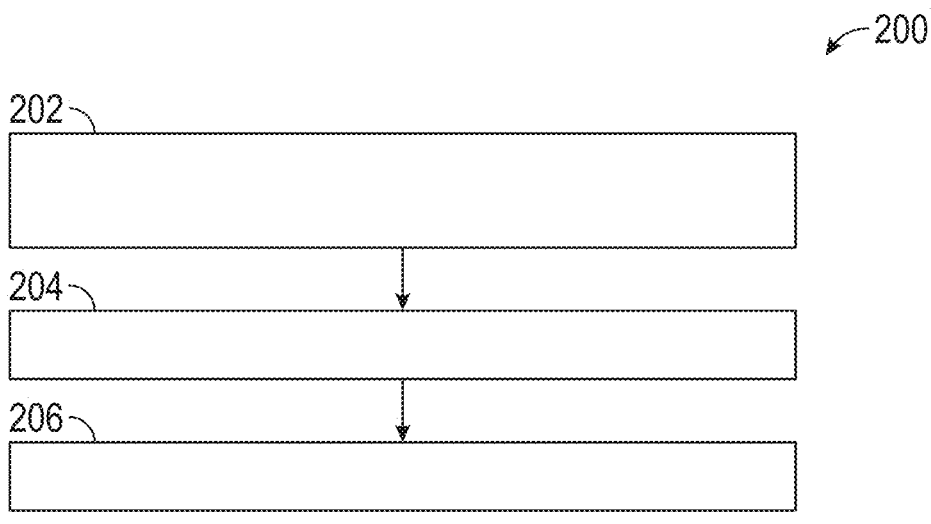
FIG. 2 shows a flowchart of a method for trajectory control, in an illustrative embodiment.

FIG. 2 shows a flowchart 200 of a method for trajectory control, in an illustrative embodiment. In box 202, side-dependent understeer coefficients are determined or calculated. The side-dependent understeer coefficients include a left turn understeer coefficient $K_{us,left}$ and a right turn understeer coefficient $K_{us,right}$. In box 204, an arbitrated understeer coefficient $K_{us,arb}$ is determined using the left turn understeer coefficient $K_{us,left}$ and a right turn understeer coefficient $K_{us,right}$. In box 206, the arbitrated understeer coefficient $K_{us,arb}$ is used for trajectory control.

Figures 3, 4:
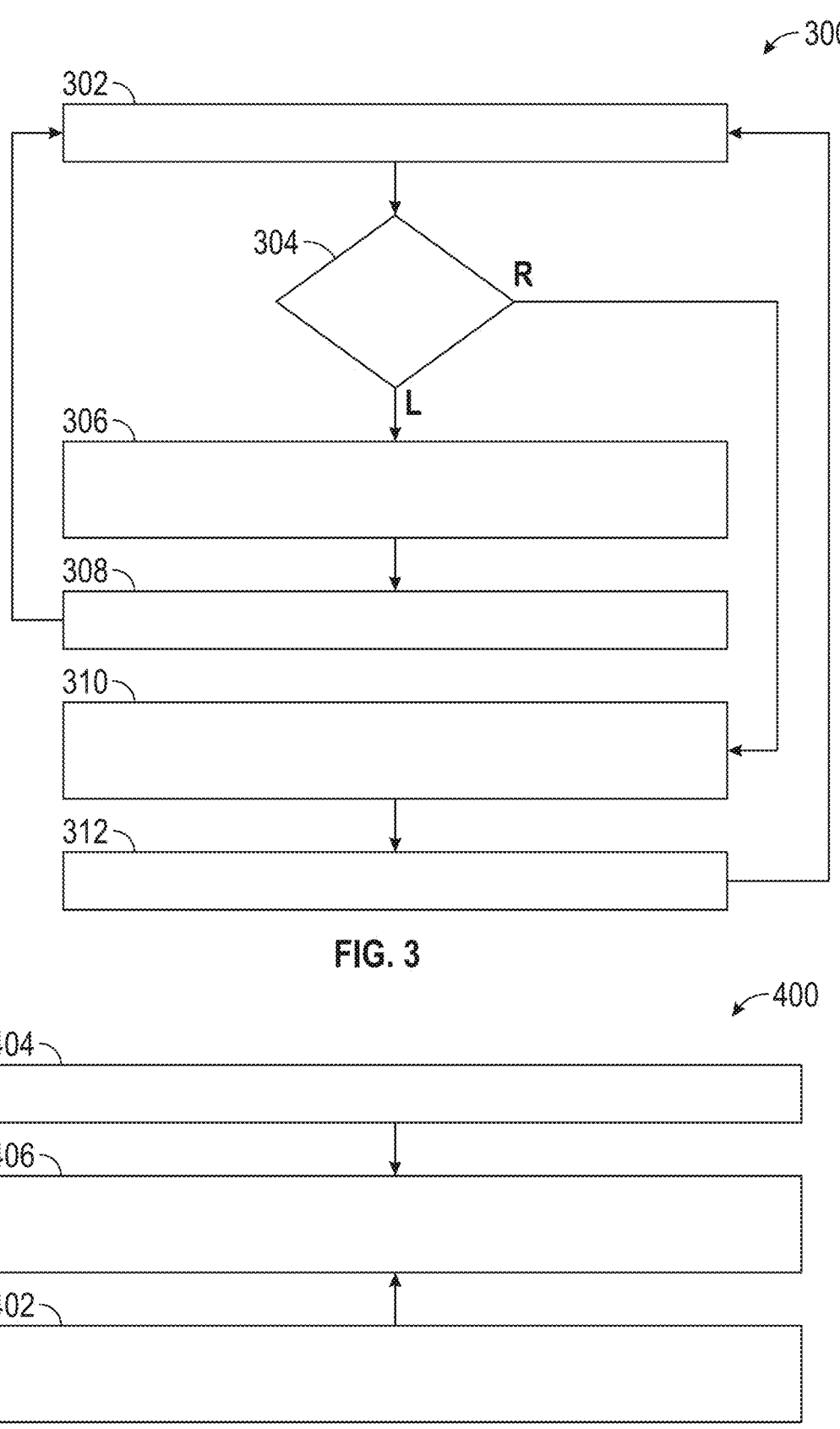
FIG. 3 shows a flowchart of a method for determining the side-dependent understeer coefficients.
FIG. 4 is a flowchart illustrating an arbitration operation.

FIG. 3 shows a flowchart 300 of a method for determining the side-dependent understeer coefficients. In box 302, an initial value for the understeer coefficient is selected. In box 304, the steering wheel angle is monitored (such as by a sensor of the sensor system 28) to determine whether the steering wheel angle is to the left (indicating a left turn) or to the right (indicating a right turn). If the steering wheel angle is to the left, the method proceeds to box 306. Otherwise, the method proceeds to box 310. In determining the steering wheel angle, the angle is compared to an angle threshold to ensure that data is suitable for use in subsequent calculations. Steering wheel angles that are close to straight-ahead driving do not have information that rises above noise levels. Thus, a steering wheel angle is selected with an absolute value that is greater than a threshold angle, such as 20 degrees, for example. In other words, calculations of the left turn understeer coefficient is enabled when a steering wheel angle is to a left side and is greater than a left turn enablement threshold and calculations of the right turn understeer coefficient are enabled when the steering wheel angle is to a right side and is greater than a right turn enablement threshold.

In box 306, the method performs calculations for determining the left turn understeer coefficient. The calculations include entering left turn parameters, including a yaw rate, lateral acceleration, longitudinal velocity and road wheel angle, into an understeer estimation equation to determine the left turn understeer coefficient. From box 306, the method proceeds to box 308. In box 308, the left turn understeer coefficient is stored in memory. The method then returns to box 302.

In box 310, the method performs calculations for determining the right turn understeer coefficient. The calculations include entering right turn parameters, including as yaw rate, lateral acceleration and longitudinal velocity and road wheel angle, into the understeer estimation equation to determine the right turn understeer coefficient. From box 310, the method proceeds to box 312. In box 312, the right turn understeer coefficient is stored in memory. The method then turns to box 302.

The understeer estimation equation used in the calculations of box 306 and box 310 is the same, while the parameters entered are different. The equation when used for determining the left turn understeer coefficient is shown in Eq. (1):

$$\delta_{left} - \frac{L\omega_{z,left}}{V_x} = (g\sin\Phi + \omega_{z,left}V_x)K_{us,left} \qquad \text{Eq. (1)}$$

where $\delta_{left}$ is the steering wheel angle in a left turn, L is a wheel based of the vehicle, $\omega_{z,left}$ is the yaw rate during the left turn, $V_x$ is the longitudinal velocity, g is the acceleration of gravity, $\Phi$ is the bank angle fo the road and kus,left is the left turn understeer coefficient.

The equation used for determining the right turn understeer coefficient is shown in Eq. (2):

$$\delta_{right} - \frac{Lw_{z,right}}{V_x} = (g\sin\Phi + w_{z,right}V_x)K_{us,right} \qquad \text{Eq. (2)}$$

where $\delta_{right}$ is the steering wheel angle in a right turn, L is a wheel based of the vehicle, $\omega_{z,right}$ is the yaw rate during the right turn, $V_x$ is the longitudinal velocity, g is the acceleration of gravity, P is the bank angle of the road and $K_{us,right}$ is the right turn understeer coefficient.

FIG. 4 is a flowchart 400 illustrating an arbitration operation. In box 402, a lookahead curvature is determined. The lookahead curvature indicates a curvature of the road within a next time frame, such as in the next 1 second or 5 seconds. The lookahead curvature can be determines using a digital camera and processing software and/or using data from a map server and/or using data from vehicle sensors, such as an inertial measurement unit (IMU).

In box 404, a steering system (with lateral control) is determined. The steering system is reviewed to see if it includes the ability to control lateral motion of the vehicle. Exemplary systems include such super cruise, lane keep assist program, etc.

In box 406, the lookahead curvature is used to determine an arbitrated understeer coefficient $K_{us,arb}$ to use in subsequent calculations and control operations. The arbitrated understeer coefficient $K_{us,arb}$ can be selected from the right turn understeer coefficient $K_{us,right}$ and left turn understeer coefficient $K_{us,left}$. Alternatively, the arbitrated understeer coefficient $K_{us,arb}$ can be an average of $K_{us,left}$ and $K_{us,right}$ or some other combination of $K_{us,left}$ and $K_{us,right}$.

Returning to FIG. 2, in box 206, the trajectory control is operated using the arbitrated understeer coefficient. The trajectory control can include feedback control or feedforward control. The trajectory control uses the arbitrated understeer coefficient when using the feedforward control. Eq. (3) shows a feedforward steering wheel angle that can be calculated and used in trajectory control:

$$\delta_{ff} = \left(L + K_{us,arb}V_x^2\right)\kappa_d + K_{us,arb}g\phi_r \qquad \text{Eq. (3)}$$

where $\delta_{ff}$ is the feedforward steering wheel angle, L is a wheelbase of the vehicle, $K_{us,arb}$ is the arbitrated understeer coefficient, $\kappa_d$ is the curvature of the road and $\phi r$ is a current bank angle of the road.

Figure 5:
FIG. 5 shows a graph illustrating understeer coefficients.

FIG. 5 shows a graph 500 illustrating understeer coefficients. An acceleration value is shown along the abscissa in meters per second squared (m/s^2) and an adjusted steering angle is shown along the ordinate axis in radians (rad). The data is obtained during various operations of the vehicle. The data is generally grouped into two clusters. A first cluster 502 indicates data obtained during a right turn and a second cluster 504 indicates data obtained during a left turn. Each cluster is an accumulation of measurements obtained over time. The understeer coefficient is estimated for each cluster separately. A first slope through the first cluster yields $K_{us,right}$. A second slope through the second cluster yields $K_{us,left}$. As shown in FIG. 5, $K_{us,right}$ and $K_{us,left}$ have different values (i.e., $K_{us,right}$=0.0025 and $K_{us,left}$=0.0018).

Figure 6:
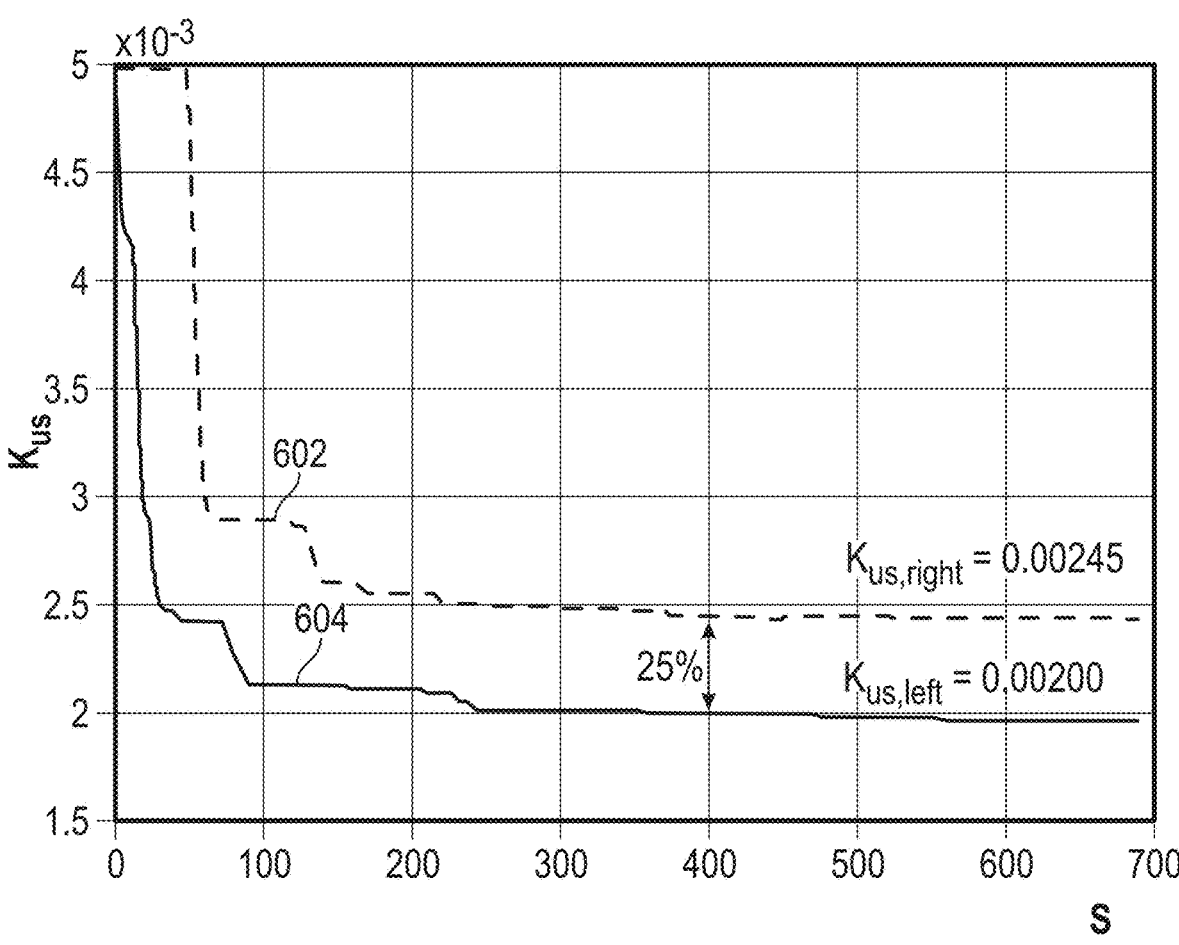
FIG. 6 shows a graph showing the evolution of side-dependent understeering coefficients over time.

FIG. 6 shows a graph 600 showing the evolution of side-dependent understeering coefficients over time. The values change as more data is accumulated. Time is shown along the abscissa in seconds and Kus (a unitless quantity) is shown along the ordinate axis. A first curve 602 shows the value of the $K_{us,right}$ over time. A second curve 604 shows the value of the $K_{us,left}$ over time. Each of the first curve 602 and the second curve 604 converge to final values. For illustrative purposes, the first curve 602 converges to $K_{us,right}$=0.00245 after about 700 seconds and the second curve 604 converges to $K_{us,left}$=0.00200 after about 700 seconds.

Figure 7:
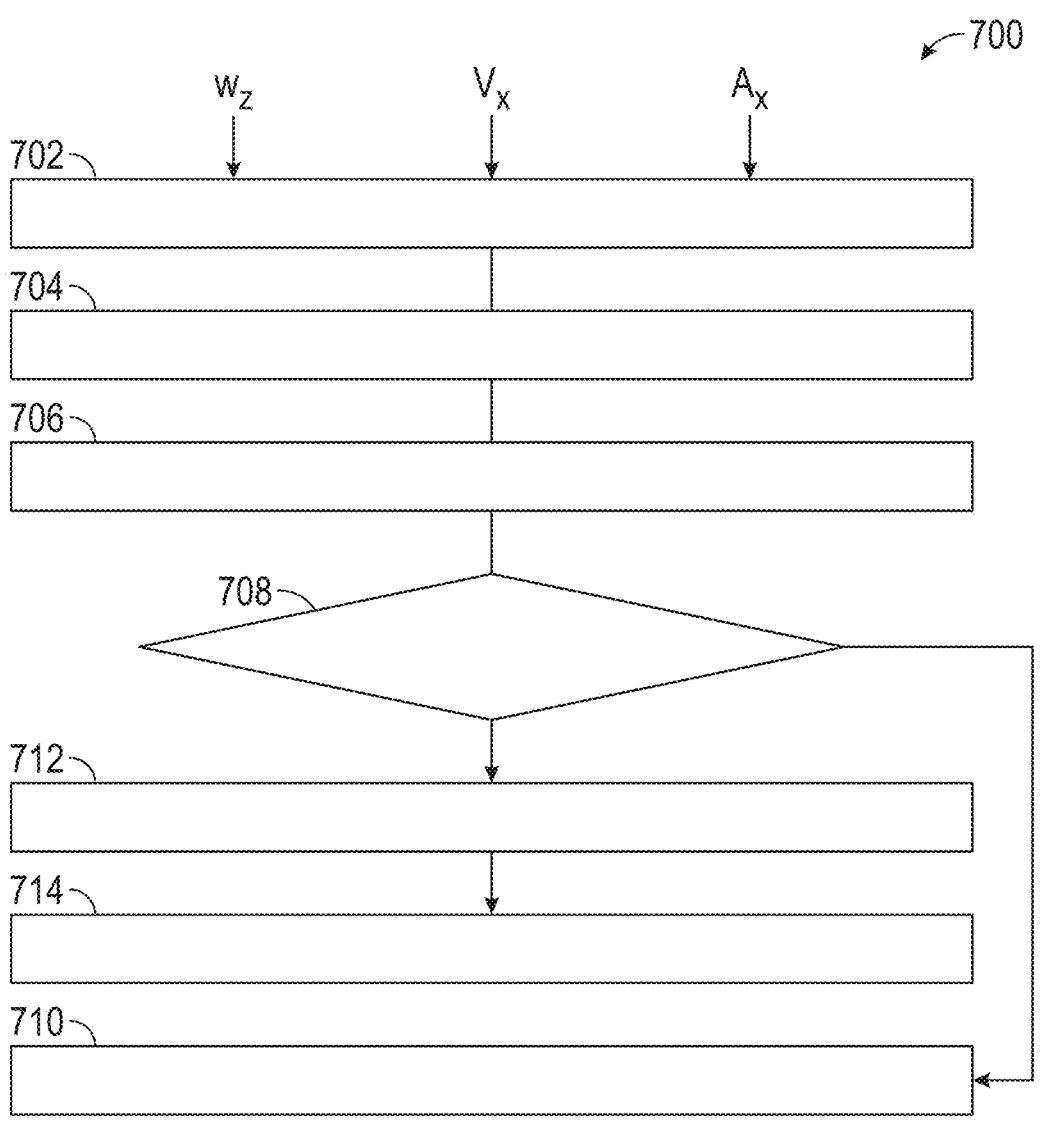
FIG. 7 shows a flowchart of a method for determining a validity of understeer calculations.

FIG. 7 shows a flowchart 700 of a method for determining a validity of understeer calculations. In box 702, the enablement conditions are checked, such as whether steering wheel angle is large enough to provide data above a selected signal to noise ratio. The enablement condition can be determined using parameters such as yaw rate, longitudinal velocity and longitudinal acceleration.

In box 704, side-dependent understeer coefficients $K_{us,right}$ and $K_{us,left}$ are calculated. In box 706, a difference in the left and right understeer coefficients are calculated, as shown in Eq. (3):

$$\Delta K_{us}=K_{us,right}-K_{us,left} \qquad \text{Eq. (3)}$$

In box 708, the difference $\Delta K_{us}$ is compared to a difference threshold. If the difference is less than the difference threshold, the method proceeds to box 710. In box 710, no action is taken.

Returning to box 708, if the difference is greater than the threshold, the method proceeds to box 712. In box 712, the cross camber and/or cross caster values are considered to be out of specification, or it is concluded that the wheels are misaligned. In box 714, an action is taken to address the camber and caster values. In various embodiments, the action includes recommending a wheel alignment procedure.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating a vehicle, comprising:
   determining a left turn understeer coefficient for the vehicle using data obtained during a left turn of the vehicle;
   determining a right turn understeer coefficient for the vehicle using data obtained during a right turn of the vehicle;
   determining an arbitrated understeer coefficient from at least one of the left turn understeer coefficient and the right turn understeer coefficient; and control a lateral motion of the vehicle by operating the vehicle using the arbitrated understeer coefficient.

2. The method of claim 1, wherein at least one of: (i) a left caster angle is different than a right caster angle; and (ii) a left camber angle is different than a right camber angle.

3. The method of claim 1, further comprising determining the left turn understeer coefficient when a steering wheel angle is to a left side and is greater than a left turn enablement threshold and determining the right turn understeer coefficient when the steering wheel angle is to a right side and is greater than a right turn enablement threshold.

4. The method of claim 1, further comprising determining a wheel misalignment when a difference between the left turn understeer coefficient and the right turn understeer coefficient is greater than a difference threshold.

5. The method of claim 1, wherein selecting the arbitrated understeer coefficient further comprises at least one of: (i) selecting the left turn understeer coefficient; (ii) selecting the right turn understeer coefficient; (iii) selecting an average of the left turn understeer coefficient and the right turn understeer coefficient; and (iv) selecting a combination of the left turn understeer coefficient and the right turn understeer coefficient.

6. The method of claim 5, further comprising one of: (i) selecting the left turn understeer coefficient when the vehicle is making a left turn; and (ii) selecting the right turn understeer coefficient when the vehicle is making a right turn.

7. The method of claim 1, wherein controlling the lateral motion of the vehicle further comprises using a feedforward steering wheel angle calculated using the arbitrated understeer coefficient.

8. A system for operating a vehicle, comprising:
a trajectory planning system for controlling a trajectory of the vehicle;
a processor configured to:
determine a left turn understeer coefficient for the vehicle using data obtained during a left turn of the vehicle;
determine a right turn understeer coefficient for the vehicle using data obtained during a right turn of the vehicle;
determine an arbitrated understeer coefficient from at least one of the left turn understeer coefficient and the right turn understeer coefficient; and
provide the arbitrated understeer coefficient to the trajectory planning system, wherein the trajectory planning system is configured to control a lateral motion of the vehicle by operating the vehicle using the arbitrated understeer coefficient.

9. The system of claim 8, wherein at least one of: (i) a left caster angle is different than a right caster angle; and (ii) a left camber angle is different than a right camber angle.

10. The system of claim 8, wherein the processor is further configured to determine the left turn understeer coefficient a steering wheel angle is to a left side and is greater than a left turn enablement threshold and determine the right turn understeer coefficient when the steering wheel angle is to a right side and is greater than a right turn enablement threshold.

11. The system of claim 8, wherein the processor is further configured to determine a wheel misalignment when a difference between the left turn understeer coefficient and the right turn understeer coefficient is greater than a difference threshold.

12. The system of claim 8, wherein the processor is further configured to select the arbitrated understeer coefficient by performing at least one of: (i) selecting the left turn understeer coefficient; (ii) selecting the right turn understeer coefficient; (iii) selecting an average of the left turn understeer coefficient and the right turn understeer coefficient; and (iv) selecting a combination of the left turn understeer coefficient and the right turn understeer coefficient.

13. The system of claim 12, wherein the processor is further configured to perform one of: (i) selecting the left turn understeer coefficient when the vehicle is making a left turn; and (ii) selecting the right turn understeer coefficient when the vehicle is making a right turn.

14. The system of claim 8, wherein the processor is further configured to control the lateral motion of the vehicle using a feedforward steering wheel angle calculated using the arbitrated understeer coefficient.

15. A vehicle, comprising:
a sensor for measuring a steering wheel angle of the vehicle;
a trajectory planning system for controlling a trajectory the vehicle;
a processor configured to:
determine a left turn understeer coefficient for the vehicle using data obtained when the steering wheel angle indicates a left turn of the vehicle;
determine a right turn understeer coefficient for the vehicle using data obtained when the steering wheel angle indicates a right turn of the vehicle;
determine an arbitrated understeer coefficient from at least one of the left turn understeer coefficient and the right turn understeer coefficient; and
provide the arbitrated understeer coefficient to the trajectory planning system, wherein the trajectory planning system is configured to control a lateral motion of the vehicle by operating the vehicle using the arbitrated understeer coefficient.

16. The vehicle of claim 15, wherein at least one of: (i) a left caster angle is different than a right caster angle; and (ii) a left camber angle is different than a right camber angle.

17. The vehicle of claim 15, wherein the processor is further configured to determine the left turn understeer coefficient when the steering wheel angle is to a left side and is greater than a left turn enablement threshold and determine the right turn understeer coefficient when the steering wheel angle is to a right side and is greater than a right turn enablement threshold.

18. The vehicle of claim 15, wherein the processor is further configured to determine a wheel misalignment when a difference between the left turn understeer coefficient and the right turn understeer coefficient is greater than a difference threshold.

19. The vehicle of claim 15, wherein the processor is further configured to select the arbitrated understeer coefficient by performing at least one of: (i) selecting the left turn understeer coefficient; (ii) selecting the right turn understeer coefficient; (iii) selecting an average of the left turn understeer coefficient and the right turn understeer coefficient; and (iv) selecting a combination of the left turn understeer coefficient and the right turn understeer coefficient.

20. The vehicle of claim 15, wherein the processor is further configured to control the lateral motion of the vehicle using a feedforward steering wheel angle calculated using the arbitrated understeer coefficient.

* * * * *